(12) United States Patent
Czarnik et al.

(10) Patent No.: US 11,566,533 B2
(45) Date of Patent: Jan. 31, 2023

(54) ELECTRICAL MACHINES FOR INTEGRATION INTO A PROPULSION ENGINE

(71) Applicants: General Electric Company, Schenectady, NY (US); General Electric Company Polska sp. z o.o., Warsaw (PL); General Electric Deutschland Holding GmbH, Frankfurt (DE)

(72) Inventors: Miroslaw Czarnik, Warsaw (PL); Adam Tomasz Pazinski, Warsaw (PL); Bartłomiej Drozd, Otrebusy (PL); Darek Zatorski, Fort Wright, KY (US); Maciej Krzysztof Grunwald, Warsaw (PL); Mohamed Osama, Garching (DE); John R. Yagielski, Scotia, NY (US)

(73) Assignees: General Electric Company, Schenectady, NY (US); General Electric Company Polska sp. z o.o., Warsaw (PL); General Electric Deutschland Holding GmbH, Frankfurt (DE)

( * ) Notice: Subject to any disclaimer, the term of this patent is extended or adjusted under 35 U.S.C. 154(b) by 56 days.

(21) Appl. No.: 17/170,229

(22) Filed: Feb. 8, 2021

(65) Prior Publication Data
US 2022/0251965 A1 Aug. 11, 2022

(51) Int. Cl.
*F01D 15/10* (2006.01)
*F01D 25/16* (2006.01)
(Continued)

(52) U.S. Cl.
CPC ............. *F01D 15/10* (2013.01); *F01D 25/12* (2013.01); *F01D 25/162* (2013.01); *F01D 25/18* (2013.01);
(Continued)

(58) Field of Classification Search
CPC ........ F01D 15/10; F01D 25/12; F01D 25/162; F01D 25/18; F01D 2260/20;
(Continued)

(56) References Cited

U.S. PATENT DOCUMENTS

| 7,642,682 B1 | 1/2010 | Matheny |
| 8,264,111 B2 | 9/2012 | Lemmers, Jr. et al. |

(Continued)

FOREIGN PATENT DOCUMENTS

EP 3613977 A1 2/2020

OTHER PUBLICATIONS

Extended European Search Report for Application No. 22150713.0 dated Jul. 18, 2022 (6 pages).

*Primary Examiner* — Igor Kershteyn
(74) *Attorney, Agent, or Firm* — Dinsmore & Shohl LLP

(57) ABSTRACT

An electrical machine includes a stator assembly coupled to an engine stator component of a propulsion engine. The stator assembly includes a stator support assembly fixedly attached to the engine stator component and a stator disposed on the stator support structure. An electrical machine shaft is coupled to an end of a shaft of the propulsion engine via an intermediate shaft member extending axially between the end of the shaft and the electrical machine shaft. A bearing support frame extends from the propulsion engine, the bearing support frame defining a bearing cavity in conjunction with the electrical machine shaft. Electrical machine bearings radially extend from the bearing support frame to rotatably contact the electrical machine shaft. A (Continued)

rotor attached to a rotor support structure attached to the electrical machine shaft. The rotor rotates in conjunction with the electrical machine shaft to exchange energy with the shaft of the propulsion engine.

20 Claims, 5 Drawing Sheets

(51) Int. Cl.
    *F01D 25/12* (2006.01)
    *F01D 25/18* (2006.01)

(52) U.S. Cl.
    CPC .. *F05D 2220/7644* (2013.01); *F05D 2240/54* (2013.01); *F05D 2240/55* (2013.01); *F05D 2240/60* (2013.01); *F05D 2260/20* (2013.01); *F05D 2260/98* (2013.01)

(58) Field of Classification Search
    CPC ......... F05D 2220/7644; F05D 2240/54; F05D 2240/55; F05D 2260/98
    See application file for complete search history.

(56) References Cited

U.S. PATENT DOCUMENTS

| | | | |
|---|---|---|---|
| 8,925,660 B2 * | 1/2015 | Bowdich | H02K 7/1815 |
| | | | 903/905 |
| 8,939,399 B2 * | 1/2015 | Kouros | B64C 27/12 |
| | | | 244/17.11 |
| 9,003,638 B2 * | 4/2015 | Menheere | H02K 15/16 |
| | | | 290/52 |
| 9,502,942 B2 | 11/2016 | Brust et al. | |
| 10,135,315 B2 | 11/2018 | Angelis et al. | |
| 10,436,251 B2 | 10/2019 | Hochstetler et al. | |
| 10,487,839 B2 | 11/2019 | Kupiszewski et al. | |
| 10,523,082 B2 | 12/2019 | Snelick et al. | |
| 10,605,111 B2 | 3/2020 | Bywater | |
| 10,615,661 B2 | 4/2020 | Snelick et al. | |
| 2014/0367510 A1 * | 12/2014 | Viala | B64D 27/24 |
| | | | 244/62 |
| 2014/0367525 A1 * | 12/2014 | Salyer | B64D 31/00 |
| | | | 60/716 |
| 2015/0013306 A1 * | 1/2015 | Shelley | F02K 5/00 |
| | | | 60/224 |
| 2015/0028594 A1 * | 1/2015 | Mariotto | H02K 7/006 |
| | | | 310/78 |
| 2016/0160867 A1 * | 6/2016 | Gehlot | F02C 7/36 |
| | | | 60/805 |
| 2017/0051834 A1 * | 2/2017 | Webster | F16J 15/4472 |
| 2017/0175564 A1 * | 6/2017 | Schlak | F01D 15/10 |
| 2018/0051701 A1 | 2/2018 | Kupiszewski et al. | |
| 2018/0051702 A1 | 2/2018 | Kupiszewski et al. | |
| 2019/0023384 A1 | 1/2019 | Lauder | |
| 2020/0251970 A1 | 8/2020 | Zatorski et al. | |
| 2020/0385130 A1 | 12/2020 | Vemna et al. | |

* cited by examiner

ELECTRICAL MACHINES FOR INTEGRATION INTO A PROPULSION ENGINE

BACKGROUND

Field

The present specification generally relates to electrical machines for incorporation into gas turbine engines.

Technical Background

Incorporating an electrical machine (e.g., an electrical generator) into a propulsion engine to generate electrical power from mechanical energy generated by the propulsion engine may enhance the capabilities of aircraft by eliminating the need for heavy and bulky energy storage devices on the aircraft. For example, the electrical power generated by the electrical machine may be used to operate an accessory propulsor (e.g., an electric fan, motor, or the like) to supplement thrust provided via the turbine engine. Introduction of such an electrical machine, however, may introduce challenges relating to size, weight, accessibility, and aerodynamic performance.

SUMMARY

An electrical machine includes a stator assembly coupled to an engine stator component of a propulsion engine. The stator assembly includes a stator support assembly fixedly attached to the engine stator component and a stator disposed on a supporting surface of the stator support structure. The electrical machine also includes a rotor assembly including a rotor support structure connected to a shaft of the propulsion engine and a rotor attached to the rotor support structure such that the rotor is disposed radially inward of the stator. The rotor exchanges rotational energy with the shaft to operate as either an electrical motor or an electrical generator.

In another embodiment, an electrical machine includes a stator assembly coupled to an engine stator component of a propulsion engine. The stator assembly includes a stator support assembly fixedly attached to the engine stator component and a stator disposed on a supporting surface of the stator support structure. The electrical machine also includes a rotor assembly comprising a rotor support structure directly connected to a shaft of the propulsion engine and a rotor attached to the rotor support structure. The rotor is disposed radially inward of the stator such that the stator assembly circumferentially surrounds the rotor. In embodiments, the rotor rotates in conjunction with the shaft to generate a power signal. In embodiments, the electrical machine receives power from an external source to provide rotational energy to the shaft.

In another embodiment, an electrical machine includes a stator assembly coupled to an engine stator component of a propulsion engine. The stator assembly includes a stator support assembly fixedly attached to the engine stator component. A stator disposed on a supporting surface of the stator support structure. The electrical machine also includes an electrical machine shaft coupled to an end of a shaft of the propulsion engine via an intermediate shaft member extending axially between the end of the shaft and the electrical machine shaft. The electrical machine also includes a bearing support frame extending from the propulsion engine, the bearing support frame including an axial portion extending in an axial direction. The electrical machine also includes electrical machine bearings radially extending from the axial portion of the bearing support frame to rotatably contact the electrical machine shaft. The electrical machine also includes a sealing member disposed axially aft of the electrical machine bearings, the sealing member extending from the axial portion of the bearing support frame to the electrical machine shaft. The electrical machine also includes a rotor assembly including a rotor support structure connected to the electrical machine shaft and a rotor attached to the rotor support structure such that the rotor is disposed radially inward of the stator. In embodiments, the rotor rotates in conjunction with the shaft of the propulsion engine via the intermediate shaft member to generate a power signal. In embodiments, the electrical machine receives power from an external source to provide rotational energy to the shaft.

In another embodiment, an electrical machine includes a stator assembly coupled to an engine stator component of a propulsion engine. The stator assembly includes a stator support assembly fixedly attached to the engine stator component and a stator disposed on a supporting surface of the stator support structure. The electrical machine also includes an electrical machine shaft coupled to an end of a shaft of the propulsion engine via an intermediate shaft member extending axially between the end of the shaft and the electrical machine shaft. The electrical machine also includes a bearing support frame extending from the propulsion engine, the bearing support frame defining a bearing cavity in conjunction with the electrical machine shaft. The electrical machine also includes first and second electrical machine bearings radially extending from the bearing support frame to rotatably contact the electrical machine shaft. The electrical machine also includes a sealing member disposed axially aft of the electrical machine bearings, the sealing member extending from the bearing support frame to the electrical machine shaft. The electrical machine also includes a rotor support structure connected to the electrical machine shaft and a rotor attached to the rotor support structure. The rotor rotates in conjunction with the electrical machine shaft to exchange energy with the shaft of the propulsion engine.

In another embodiment, a propulsion engine includes a core portion generating exhaust that travels in an axial direction and a turbine section coupled to a shaft. The turbine section receives the exhaust and generates mechanical energy to rotate the shaft. The propulsion engine also includes a turbine frame attached to the turbine section, and the turbine frame includes an outer casing coupled to the turbine section and an inner hub supporting the shaft via a bearing assembly comprising an engine bearing supporting the shaft. The propulsion engine also includes an electrical machine including a stator assembly comprising a stator support assembly attached to the inner hub and a stator attached to the stator support structure; an electrical machine shaft coupled to an end of the shaft via an intermediate shaft member extending axially between the end of the shaft and the electrical machine shaft; a bearing support frame attached to the inner hub and extending radially inward therefrom to define a bearing cavity extending between the bearing support frame and electrical machine shaft; electrical machine bearings radially extending from the bearing support frame to rotatably contact the electrical machine shaft; and a rotor assembly. The rotor assembly includes a rotor support structure connected to the electrical machine shaft and a rotor attached to the rotor support structure and extending radially inward of the stator. The rotor rotates in conjunction with the shaft via the intermediate shaft member to exchange energy with the shaft.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
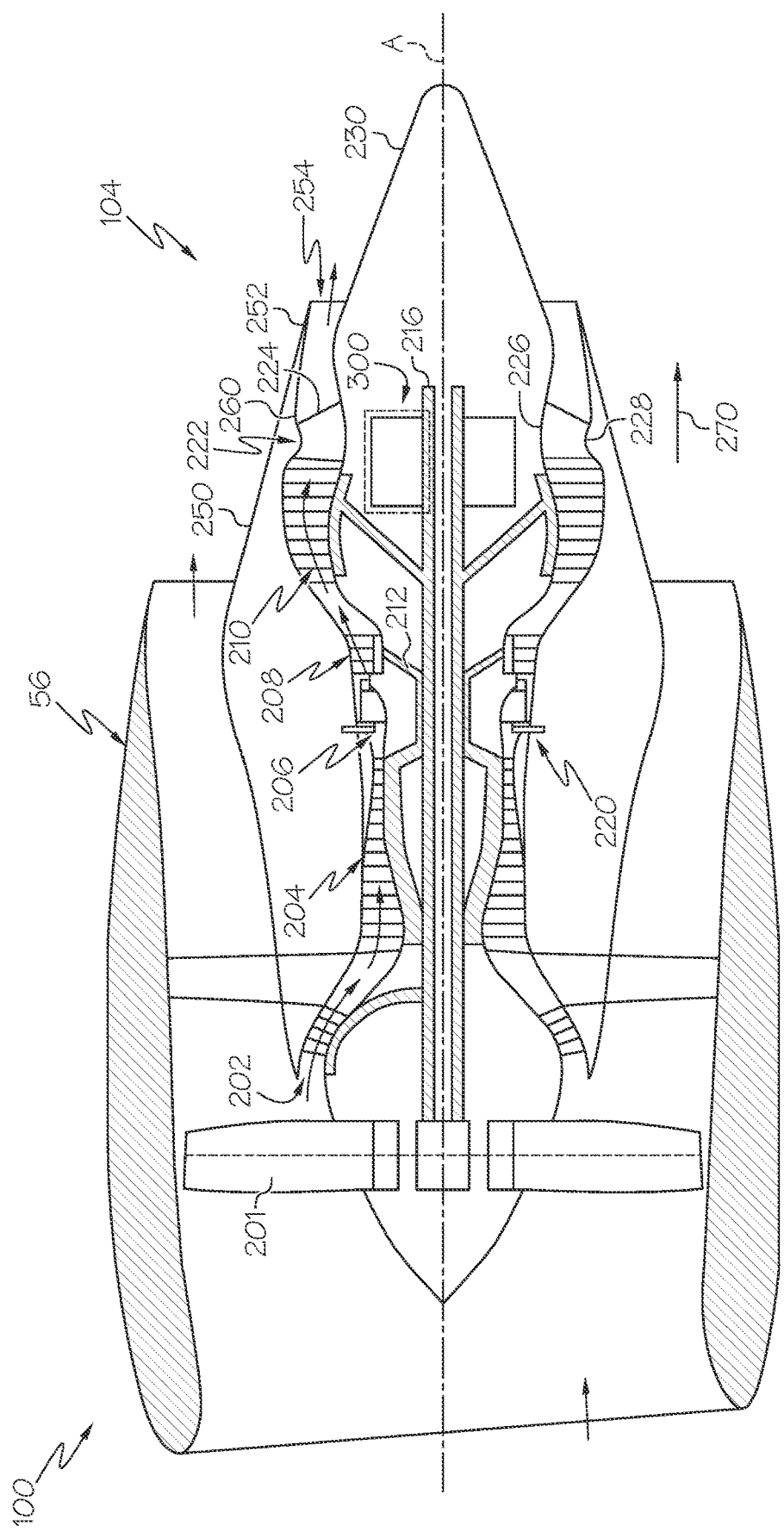
FIG. 1 depicts a cross-sectional view of the propulsion engine depicted in FIG. 1 above a central axis A-A thereof, according to one or more embodiments described herein.

Reference will now be made to electrical machines for integration into a propulsion engine such as a turbine engine. The electrical machines described herein may be disposed at various axial locations within the propulsion engine (e.g., at an aft end of the propulsion engine, between ends of a shaft a propulsion engine) to facilitate an exchange of rotational energy between the shaft and the electrical machine. For example, the electrical machines described herein may include a stator assembly coupled to an engine stator component and a rotor assembly that is connected with the shaft of the propulsion engine such that a rotor of the rotor assembly rotates in conjunction with the shaft to facilitate an exchange of rotational energy between the rotor assembly and the shaft. The electrical machines described herein may be operated in a generator mode, in which rotational energy from the shaft generates a power signal in a stator that is provided by an electrical connector to other components of the propulsion engine or aircraft; and a motor mode, in which electrical power is provided to the electrical machine from an external source (e.g., a power storage device disposed on the aircraft) such that the rotor alters the rotational speed of the shaft.

In embodiments, the rotor assembly may be directly or indirectly attached to the shaft of the propulsion engine using different attachment structures that may have differing effects on the vibration of the shaft. For example, in embodiments, the rotor assembly includes a rotor support structure directly connected to the shaft of the propulsion engine such that the rotor assembly is supported by a bearing assembly already incorporated into the propulsion engine. In such embodiments, the rotor support assembly may be designed to have a desired effect on the natural vibration frequencies of the shaft of the propulsion engine. For example, in embodiments, the structure of the rotor support structure is designed to alter a vibration frequency of the shaft. In embodiments, the electrical load of the electrical machine (e.g., via switchable coil connections in the rotor and stator) may be modulated to controllably dampen vibrations of the shaft of the propulsion engine to improve the long-term operability thereof.

In embodiments, the rotor assembly is indirectly attached to the shaft of the propulsion engine via an electrical machine shaft rotatably coupled to the shaft of the propulsion engine with an intermediate shaft member allowing axial and radial displacements of the electrical machine shaft. The electrical machine in such embodiments may be supported by its own generator bearings to protect the electrical machine from vibrations of the shaft of the propulsion engine. Such separate shaft and bearing embodiments may also be beneficial in that the intermediate shaft member in that the intermediate shaft member may enable decoupling of the electrical machine shaft from the engine shaft to protect the engine from the electrical machine in the event of a malfunction.

In embodiments, the electrical machine may be positioned in an aft portion of the propulsion engine (e.g., proximate to a turbine rear frame). Such positioning beneficially renders the electrical machine accessible for maintenance and repair while the propulsion engine and electrical machine are installed an aircraft (e.g., on a wing, on a fuselage, or the like). Additionally, in embodiments, the electrical machine may be positioned within a tail cone of the propulsion engine and be directly accessible for repairs after performance of a non-invasive procedure (e.g., opening of core cowl, removal of aft skin, and removal tail cone) on the remainder of the propulsion engine. This way, the electrical machine may be efficiently maintained while not disrupting operation of the other components of the propulsion engine. Additionally, various components of the electrical machine (e.g., the rotor assembly and the stator assembly) may be designed to allow independent removal thereof from the propulsion engine. Such non-invasive access to the electrical machine beneficially facilitates maintenance and repair of the electrical machine while the propulsion engine is installed on an aircraft (e.g., on a wing, a fuselage, or the like of the aircraft).

Referring to FIG. 1, a propulsion engine 100 is schematically depicted. The propulsion engine 100 may take various forms depending on the implementation. In the embodiments described herein, the propulsion engine 100 is a high-bypass turbofan engine. However, other types of turbine engines are contemplated and are within the scope of the present disclosure. As depicted in FIG. 1, the propulsion engine 100 includes an electrical machine 300 disposed in an aft portion 104 of the propulsion engine 100. The aft portion 104 is disposed axially downstream (e.g., in a direction parallel to a central axis A-A of the propulsion engine 100) of a core portion 220 of the propulsion engine 100. In embodiments, the electrical machine 300 converts mechanical energy (e.g., generated from exhaust gases generated in the core portion 220) produced by the propulsion engine 100 into electrical energy that may be used to power electrical devices of the propulsion engine 100 or components disposed elsewhere on an aircraft (including components that incorporate the propulsion engine 100). As described herein, positioning the electrical machine 300 in the aft portion 104 of the propulsion engine 100 beneficially renders the electrical machine 300 accessible for maintenance, repair, and replacement while the propulsion engine 100 is disposed on an aircraft (e.g., on a wing or fuselage of the aircraft). The electrical machine 300 is designed to be integrated into the propulsion engine 100 via a set of connections that may be removed without invasively disassembling the entirety of the propulsion engine 100 (e.g., removing without detaching the propulsion engine 100 from the aircraft).

In embodiments, the electrical machine 300 may be attached to an inner hub 226 of a turbine rear frame 222 of the propulsion engine 100. Example embodiments of the structure of the electrical machine 300 are described in greater detail herein. Still referring to FIG. 1, it should be understood that the depicted arrangement of the propulsion engine 100 is only exemplary is not intended to be limiting. For example, in alternative embodiments, the electrical machine 300 may be disposed axially forward of the core portion 220.

Positioning the electrical machine 300 in the aft portion 104 provides accessibility, but creates additional design considerations for the propulsion engine 100. Exhaust gases generated via the core portion 220 are at relatively high temperatures (e.g., in excess of about 700° C. or more in various embodiments), which renders cooling the electrical machine 300 beneficial. Additionally, the aft portion 104 of the propulsion engine 100 may not be directly connected to an aircraft incorporating the propulsion engine 100. Given this, electrical signals routed to and from the electrical machine 300 are routed through the propulsion engine 100. In embodiments, for example, the propulsion engine 100 includes an electrical system (not depicted in FIG. 1) including a plurality of electrical lines that connect the electrical machine 300 to an electrical machine control unit (not depicted in FIG. 1). In embodiments, the electrical lines are disposed within cooling ducts that provide coolant (e.g., from a bypass section disposed radially outward from the core portion 220) to the aft portion 104. In embodiments, the electrical lines are disposed externally to the cooling ducts.

In embodiments, electrical machine control unit converts the power signal generated by the electrical machine 300 (between an alternating current signal and direct current signal, or vice versa) for provision to additional components of the propulsion engine 100 or incorporating aircraft. In embodiments, as described in greater detail herein, the electrical machine control unit may also provide control signals to the electrical machine 300 to change the mode of operation thereof (e.g., between an electrical generator mode and an electrical motor mode) and/or the load thereof to change the rotational energy exchange between the electrical machine 300 and additional components of the propulsion engine 100. In embodiments, the electrical machine control unit may be disposed in a location within the propulsion engine 100 that is displaced from the electrical machine 300 (e.g., axially forward of the core portion 220), or elsewhere on the aircraft (e.g., in a pylon).

Referring still to FIG. 1, the propulsion engine 100 includes a fan 201, a low pressure compressor 202, a high pressure compressor 204, and a combustor 206, which mixes air compressed via the high pressure compressor 204 with fuel for generating combustion gases that flow downstream through a high pressure turbine 208 and a low pressure turbine 210 to generate pressurized exhaust. A first shaft 212 joins the high pressure compressor 204 to the high pressure turbine 208. A second shaft 216 joins the low pressure turbine 210 to the fan 201 and the low pressure compressor 202. In embodiments, the high pressure compressor 204, the combustor 206, and the high pressure turbine 208 may collectively form the core portion 220. The core portion 220 may generate combustion gases that are channeled to the low pressure turbine 210, which in turn powers the fan 201 via the second shaft 216. The low pressure turbine 210 may include a plurality of rows of blades that rotate in response to the combustion gases from the core portion 220 and thereby cause the second shaft 216 to rotate, thereby powering the fan 201, low pressure compressor 202, and the electrical machine 300.

The turbine rear frame 222 is disposed aft of the low pressure turbine 210 (e.g., offset from the low pressure turbine 210 in an aft direction (e.g., an axial direction 272) extending parallel to the central axis A-A). The turbine rear frame 222 includes a plurality of struts 224 extending between an inner hub 226 and an outer casing 228. The turbine rear frame 222 provides an exhaust flow path for exhaust flowing from the low pressure turbine 210. The inner hub 226 and the outer casing 228 may circumferentially surround the second shaft 216 and the plurality of struts 224 may be distributed around the second shaft 216. In embodiments, the plurality of struts 224 function as outlet guide vanes to straighten the exhaust airflow, which may flow over a tail cone 230 to improve performance of the propulsion engine 100. It should be understood that the turbine rear frame 222 may include any number of struts 224 in any arrangement consistent with the present disclosure.

Referring still to FIG. 1, the propulsion engine 100 includes a core cowl 250 and an aft skin 252. The core cowl 250 delineates a flow path for air compressed by the fan 201. In embodiments, the aft skin 252 is connected to the outer casing of the turbine rear frame 222 via a bolted connection (not depicted). In embodiments, exhaust exits the propulsion engine 100 via an outlet 254 defined by the turbine rear frame 222, the aft skin 252, and the tail cone 230.

Figure 2:
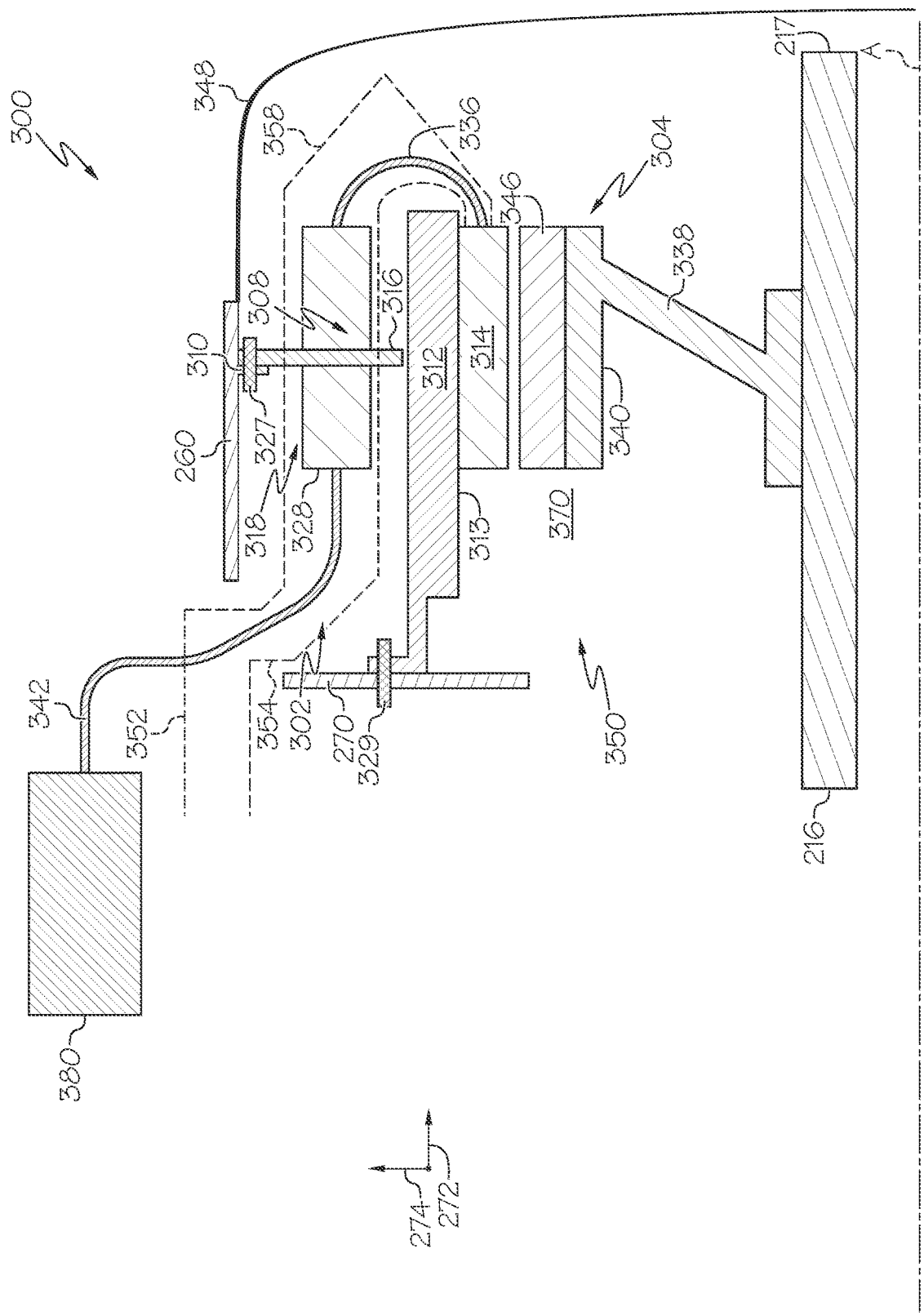
FIG. 2 depicts an enlarged view of an electrical machine of the propulsion engine depicted in FIG. 1 according to one or more embodiments described herein.

Referring now to FIG. 2, a detailed view of a sectional portion of the electrical machine 300 depicted in the dashed boundary of FIG. 1 is shown. In the depicted embodiment, the electrical machine 300 includes a stator assembly 302 and a rotor assembly 304. The stator assembly 302 is directly connected to the propulsion engine 100 via a first engine stator component 260 and a second engine stator component 270. The first and second engine stator components 260 and 270 may vary depending on the particular location at which the electrical machine 300 is disposed within the propulsion engine 100. For example, as described herein with respect to FIG. 1, the electrical machine 300 is disposed in the aft portion 104 of the propulsion engine 100. In such embodiments, the first engine stator component 260 may be a flow-defining structure such as the turbine rear frame 222 depicted in FIG. 1 (e.g., the stator assembly 302 may be attached to the inner hub 226) and the second engine stator component 270 may be another component extending radially between the second shaft 216 and the inner hub 226 (e.g., a turbine component such as a bearing support structure or the like). Alternative locations of the electrical machine 300 are contemplated and within the scope of the present disclosure. For example, in embodiments, the electrical machine 300 is disposed between the ends of the second shaft 216 (e.g., axially forward of an aft end 217 of the second shaft 216 and the turbine rear frame 222). In such embodiments, the first engine stator component 260 may be another flow path-defining structure (e.g., mid turbine frame or the like). Various points of connection between the electrical machine 300 and the propulsion engine 100 are contemplated and within the scope of the present disclosure.

The stator assembly 302 includes a stator 314 and the rotor assembly 304 includes a rotor 346. In the depicted embodiment, the rotor assembly 304 is disposed radially inward of the stator assembly 302 (e.g., the entire rotor assembly 304 is disposed more proximate to the second shaft 216 than the stator assembly 302). In embodiments, the stator assembly 302 circumferentially surrounds the rotor assembly 304, such that the rotor assembly 304 is disposed radially between the stator assembly 302 and the second shaft 216 of the propulsion engine 100. In embodiments, the electrical machine 300 is operated as an electrical generator converting rotational energy of the second shaft 216 (e.g., during flight operation of the propulsion engine 100) into electrical energy that may be conveyed to other components of an aircraft. In embodiments, the electrical machine 300 is operated as a motor to provide torque to the second shaft 216 (e.g., to increase operational efficiency of the propulsion engine 100).

The inner-rotor construction of the electrical machine 300 facilitates compactness (e.g., aerodynamic performance) and operability thereof. For example, the inner-rotor construction of the electrical machine 300 may facilitate long-term operability thereof over embodiments where the stator assembly 302 is disposed radially inward of the rotor assembly 304 by reducing rotational loads imparted on the structural components supporting the rotor 346 during operation of the electrical machine 300. Additionally, the inner-rotor construction of the electrical machine 300 depicted in FIG. 2 may facilitate the stator assembly 302 acting as a shield to prevent damaged rotor components from traveling in a radially outward direction and impacting additional components of the propulsion engine 100. For example, if the electrical machine 300 malfunctions, a piece of the rotor assembly 304 may break and become disconnected from the second shaft 216. Such a broken component may disrupt operation of the propulsion engine 100 if left unimpeded. Due to the inner-rotor construction of the electrical machine 300, however, such broken rotor components are contained within a rotor cavity 370 delineated by the stator assembly 302. Containment of debris by the stator assembly 302 reduces the likelihood of electrical machine malfunction affecting operation of other components of the propulsion engine 100 or high energy components being released from the propulsion engine 100. Embodiments with an outer-rotor construction are contemplated and within the scope of the present disclosure, but may include a debris shield disposed radially outward of the rotor assembly 304.

In the embodiment depicted in FIG. 2, the electrical machine 300 is directly connected to the second shaft 216 via a rotor support structure 338 of the rotor assembly 304. In embodiments, the rotor support structure 338 includes an attachment element (e.g., a groove, protrusion, or the like, which is not depicted) that slidably engages with a corresponding attachment element on the second shaft 216. For example, in embodiments, the rotor support structure 338 may slidably engage with the second shaft 216 at an aft end 217 of the second shaft 216. A locking nut (not depicted) may secure the rotor support structure 338 to the second shaft 216 such that the rotor assembly 304 rotates in conjunction with the second shaft 216 to facilitate generation of electrical power via the rotation of the second shaft 216.

Such embodiments where the rotor assembly 304 is attached directly to the second shaft 216 may be referred to herein as "embedded generator embodiments." In embedded generator embodiments, the rotor assembly 304 may be supported at least in part by a bearing assembly supporting the second shaft 216 (e.g., an engine bearing assembly—not depicted—supporting the aft portion 104 of the propulsion engine 100, disposed axially proximate to the turbine rear frame 222). Embedded generator embodiments may be beneficial in that the electrical machine 300 may function as a shaft natural frequency damper. In embodiments, components of the rotor assembly 304 (e.g., the rotor support structure 338) may be structurally designed to modify a natural frequency of the second shaft 216 (e.g., to alter the natural vibrational frequency of the second shaft 216 as compared to embodiments not incorporating the electrical machine 300). For example, in embodiments, the stiffness and volume of the rotor support structure 338 may be selected to remove the natural vibration frequency of the second shaft 216 from a range where vibration of the second shaft 216 is likely to excite vibrational modes of other components of the propulsion engine 100, thereby avoiding structural integrity issues associated with high amplitude oscillations.

In embodiments, the electrical machine 300 may be designed to variably impact the natural vibration frequencies of the second shaft 216 via external control thereof. In the depicted embodiment, for example, the electrical machine 300 is communicably coupled (e.g., via electrical lines 336 and 342 and an electrical connection device 328, described herein) to an electrical machine control unit 380. The electrical machine control unit 380 may control the electrical machine 300 based on power demand by altering the electrical load. In embodiments, the electrical machine control unit 380 is disposed in an axially different location of the propulsion engine 100 than the electrical machine 300. In embodiments, the electrical machine control unit 380 is disposed at the same axial location as the electrical machine 100 within the propulsion engine.

In embodiments, for example, the electrical machine control unit 380 receives instructions from another component (e.g., an engine power control unit) associated with the aircraft to modulate the electrical machine load to alter the rotational energy extracted from the second shaft 216 via rotation of the rotor 346, thereby controllably dampening vibrations of the second shaft 216. For example, the electrical machine control unit 380 may alter the electrical load of the electrical machine 300 (e.g., by switching electrical connections between coils thereof off and on) in response to vibrations of the second shaft 216 being detected in order to dampen the detected vibrations. Such electrical load control by the electrical machine control unit 380 may occur in both a generator working mode and a motor working mode of the electrical machine 300.

Referring still to FIG. 2, the rotor assembly 304 further includes a rotor attachment arm 340 extending axially forward from an end of the rotor support structure 338. The rotor attachment arm 340 maintains the rotor 346 in spaced relation to the stator 314 and second shaft 216. In embodiments, the rotor 346 comprises a plurality of permanent magnets circumferentially distributed about the stator 314 such that rotation of the rotor 346 about the stator 314 generates an AC power signal. It should be understood that alternative configurations for the rotor 346 are envisioned depending on the implementation of the electrical machine 300. For example, in embodiments, the rotor 346 may include a plurality of electromagnets and active circuitry. Various implementations are envisioned wherein the electrical machine 300 is configured as an induction type generator, a switched reluctance generator, an asynchronous AC electrical machine, or any suitable type of electric generator.

In embodiments, the stator assembly 302 circumferentially surrounds the rotor assembly 304. In embodiments, the stator assembly 302 (e.g., the stator support assembly 308, described herein) includes a plurality of circumferential segments that can each be individually detached from the propulsion engine 100 to facilitate removal thereof. Such embodiments incorporating a plurality of circumferential segments may be particularly beneficial in embodiments where the electrical machine is centrally disposed within the propulsion engine 100 (e.g., away from the ends of the second shaft 216), as accessing the electrical machine 300 for maintenance or replacement may be more time consuming in such embodiments.

In the depicted embodiment, the stator assembly 302 is attached to the first and second engine stator components 260 and 270 via first and second connection bolts 327 and 329, respectively. The stator assembly 302 includes a stator support assembly 308 holding the stator 314 in a desired position relative to the rotor 346. The stator support assembly 308 includes a stator support arm 312. The stator support arm 312 extends in the axial direction 272 (e.g., parallel to the second shaft 216) and defines a stator support surface 313 where the stator 314 is attached to the stator support assembly 308.

In embodiments, the stator support arm 312 extends over the entirety of the rotor 346 in the axial direction 272 to define the rotor cavity 370 extending between the stator support arm 312 and the second shaft 216. In embodiments, the stator support arm 312 comprises a length in the axial direction 272 that is greater than that of the rotor 346. In addition to providing structural support to the stator 314, the stator support arm 312 contributes to containment of any debris associated with the rotor assembly 304 (e.g., in conjunction with a debris shield disposed radially outward of the stator support arm 302), thereby preventing release of high energy components outside of the propulsion engine 100. That is, the stator support arm 312 may act as a shield to prevent malfunctioning of the rotor assembly 304 from disrupting the operation of other components of the propulsion engine 100 or to prevent the rotor assembly 304 from emitting high energy debris outside of the propulsion engine 100. In embodiments, the stator support arm 312 is the sole containment mechanism of the propulsion engine 100 for containing such debris from the rotor assembly 304. That is, the inner-rotor construction of the electrical machine 300 may eliminate the need for debris shields surrounding the electrical machine 300.

In embodiments, the stator support arm 312 comprises a substantially cylindrical structure surrounding the second shaft 216. In embodiments, the substantially cylindrical structure is an integrated, continuous body. In embodiments, the stator support arm 312 comprises a plurality of circumferential segments, with each of the plurality of circumferential segments being connected to one another in order to facilitate individual removal of each circumferential segment radially away from the second shaft 216. In embodiments, the plurality of circumferential segments are non-continuous circumferentially. That is, in such embodiments, the stator support arm 312 may comprise gaps around a circumference thereof.

In embodiments, electrical and fluid connections of the electrical machine 300 are facilitated through the structure of the stator support assembly 308. In the embodiment depicted in FIG. 2, for example, the electrical machine 300 includes a connector support 316 extending radially between the first engine stator component 260 and the stator support arm 312. In embodiments, the connector support 316 includes at least one opening 318 for supporting an electrical connection device 328. It should be understood that embodiments are also envisioned where the electrical machine 300 does not include the connector support 316 or where the connector support 316 is disposed in a different location than that depicted in FIG. 2. The electrical connection device 328 may conductively connect an electrical line 336 from the stator 314 to an external electrical line 342. In embodiments, the connector support 316 functions as a holder of the electrical connection device 328 to facilitate electrically connecting the electrical machine 300 to other components of the propulsion engine 100. In embodiments, the connector support 316 comprises a plurality of openings 318 that are distributed around the circumference of the stator support assembly 308. An electrical connector may extend through each one of the plurality of openings to facilitate provision of electrical signals generated by the electrical machine 300 to external components. It should be understood that alternative locations are envisioned for the electrical connection device 328. That is, the electrical connection device 328 may be disposed along the electrical lines 336 and 342 at alternative locations than that depicted in FIG. 2 (e.g., axially forward of the electrical machine 300). In such embodiments with alternative positioning of the electrical connection device 328, the electrical machine 300 may not include the connector support 316.

In embodiments, the electrical machine 300 includes a cooling system 350 distributing coolant to various portions of the electrical machine 300. In the depicted embodiment, the cooling system 350 includes an inlet manifold 352 and a stator manifold 354. The inlet manifold 352 receives coolant air from portions of the propulsion engine 100 that are external to the electrical machine 300. In embodiments, the inlet manifold 352 is a portion of or connected to another cooling duct of the propulsion engine 100. In embodiments, the inlet manifold 352 may be routed through the first engine stator component 260 (e.g., through one of the struts 224 of the turbine rear frame 222 depicted in FIG. 1). The stator manifold 354 provides coolant to the stator 314 to maintain a temperature thereof within a suitable operating range. In embodiments, one or more of the electrical lines and the electrical connection device is disposed within the cooling system 350. For example, in the depicted embodiment, the electrical lines 336 and 342 extend through the stator manifold 354 and the inlet manifold 356, respectively, and are conductively connected within the stator manifold 354 via the electrical connection device 328. Embodiments are also envisioned where electrical lines are disposed outside of the cooling system 350. In embodiments, the stator support arm 312 comprises holes or openings to lead to cooling manifolds other than those depicted in FIG. 2.

In the embodiment depicted in FIG. 2, electrical and fluid connections via the cooling system 350 are disposed at an aft end of the stator 314 (e.g., via the connecting portion 358 of the stator manifold 354). It should be appreciated that alternative embodiments are contemplated and within the scope of the present disclosure. For example, in embodiments, the electrical line 336 may extend from an axially forward end of the stator 314, and the stator manifold 354 may extend through the stator support arm 312 to facilitate attachment and connection to the axially forward end of the stator (e.g., the stator manifold 354 may not include the connecting portion 358 including a bend, as in the depicted embodiment). In such embodiments, the electrical connection device 328 may also be disposed axially forward of the stator 314. For example, the electrical connection device 328 may be supported within or externally to a portion of the stator manifold 354 extending through the stator support arm 312 to facilitate electrical connection with the external electrical line 342. Such embodiments may not include the connector support 316 (the depicted embodiments may also not include the connector support 316). Various combinations of electrical connection and fluid coupling structures are contemplated and within the scope of the present disclosure.

In embodiments, the electrical machine 300 comprises a thermal shield 348. In embodiments, the thermal shield 348 does not directly attach to the second shaft 216 but rather circumferentially surrounds the aft end 217 of the second shaft 216, the stator assembly 302, and the rotor assembly 304. In embodiments, the thermal shield 348 is attached to the first engine stator component 260. For example, in embodiments, the thermal shield 348 is attached to the connection flange 310 of the first engine stator component 260 via the first connection bolt 327. In embodiments, the thermal shield 348 comprises at least two components. In embodiments, for example, the thermal shield 348 comprises a stator portion circumferentially surrounding the stator assembly 302 and a rotor portion extending axially aft of the rotor 346. In embodiments, the separate portions of the thermal shield 348 may be separately removed from the propulsion engine 100 to facilitate access to the rotor assembly 304 without disruption the connections of the stator assembly 302.

The view depicted in FIG. 2 corresponds to a single circumferential section of the electrical machine 300. As such, it should be understood that the electrical machine 300 may include any number of the components depicted in FIG. 2 distributed around the circumference of the second shaft 216. The components depicted in FIG. 2 may also be split axially. That is, each component depicted in FIG. 2 is a continuous section (e.g., the stator support arm 312) may be split into a plurality of segments extending in the axial direction 272 that extend from one another. In embodiments, the electrical machine 300 includes a plurality of cooling systems that are similar to the cooling system 350 depicted in FIG. 2 (e.g., having a plurality of manifolds, electrical connectors, and electrical lines extending therethrough) distributed around the circumference thereof. Moreover, the components of the electrical machine 300 (e.g., the stator support assembly 308, thermal shield 348, etc.) may be connected to the propulsion engine 100 at any number of points along the circumference thereof. That is, the electrical machine 300 may include a plurality of first and second connection bolts 327 and 329 distributed around its circumference.

Figure 3:
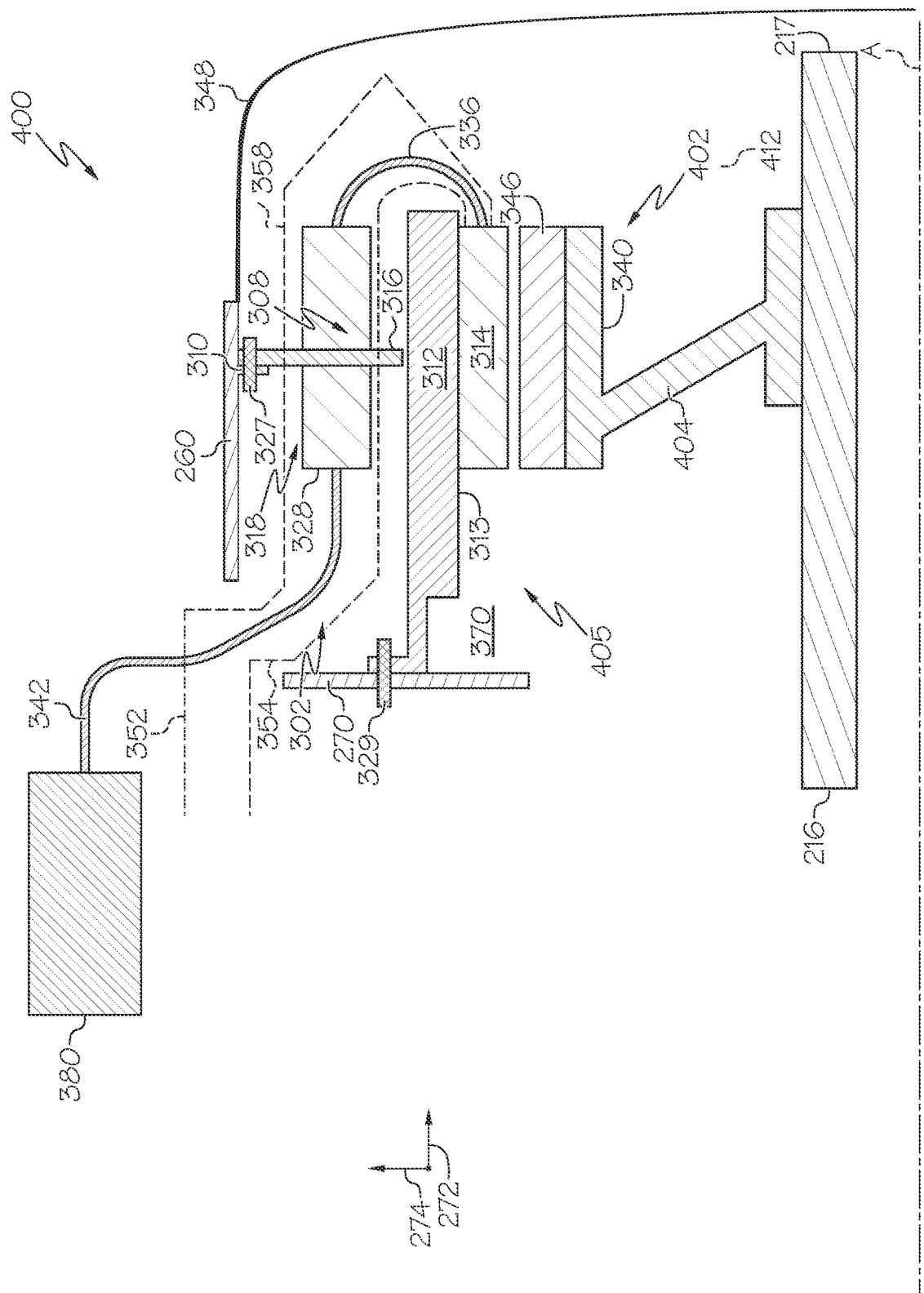
FIG. 3 schematically depicts a sectional view of an electrical machine that may be incorporated into the propulsion engine depicted in FIG. 1, according to one or more embodiments described herein.

Having described various components of the electrical machine 300 and the propulsion engine 100, various advantages of the structures described with respect to FIGS. 2 and 3 can now be appreciated. For example, referring to FIG. 1, to render the electrical machine 300 entirely accessible, the tail cone 230 may be removed. After removal of the tail cone 230, at least a portion of the electrical machine 300 may be removed from the propulsion engine 100. Depending on the type of operation being performed, all or a portion of the electrical machine 300 may be removed, depending on the process followed. For example, in embodiments, the plurality of first and second connection bolts 327 and 329 attaching the stator assembly 302 to the first and second engine stator components 260 and 270 may be removed to facilitate removal of the thermal shield 348. A connection between the rotor support structure 338 and the second shaft 216 may then be loosened to facilitate removal of the rotor assembly 304 for replacement and/or maintenance. The stator assembly 302 may also be removed from the first and second engine stator components 260 and 270.

In embodiments, rather than removal of the stator assembly 302, the rotor assembly 304 may be removed from the second shaft 216 without removal of the connections at the plurality of first and second connection bolts 327 and 329. The non-radially overlapping structure of the stator assembly 302 and rotor assembly 304 facilitates access and removal of the rotor assembly 304 from the propulsion engine 100 without disruption of the stator assembly 302, facilitating prompt and effective maintenance operations.

The manner with which the electrical machine 300 is positioned and connected within the propulsion engine 100 thus facilitates access and removal of the electrical machine 300 without removing any components of the propulsion engine 100 that are disposed forward (e.g., the opposite of the axial direction 272 depicted in FIG. 2) or radially-inward of the turbine rear frame 222. Accessing the electrical machine 300 in such a non-invasive manner facilitates maintenance or replacement of various components of the electrical machine 300 while the propulsion engine 100 is disposed on a wing or fuselage of an aircraft, which minimizes time that the aircraft may be out of commission if the electrical machine 300 needs repairs. Furthermore, the manner with which the electrical machine 300 is connected to various components of the propulsion engine 100 provides for a streamlined process for removal of the electrical machine 300 from the propulsion engine 100.

Referring now to FIG. 3, a cross-sectional view of an electrical machine 400 that may be integrated into a propulsion engine (such as the propulsion engine 100 described herein with respect to FIG. 1) is schematically depicted. The electrical machine 400 may include components of the electrical machine 300 described herein with respect to FIG. 2. Accordingly, like reference numerals are utilized in FIG. 3 to indicate the incorporation of such like components. The electrical machine 400 is also an embedded generator embodiment, including a rotor 346 fixedly attached to the second shaft 216. The electrical machine 400 includes the stator assembly 302 described with respect to the electrical machine 300 depicted in FIG. 2. The electrical machine 400 further includes a rotor assembly 402 that differs in structure from the rotor assembly 304 described with respect to FIG. 3 in that the rotor assembly 402 includes a rotor support structure 404 extending axially forward from its point of attachment to the second shaft 216. In embodiments, the rotor support structure 404 is connected to the second shaft 216 at an aft end 217 of the second shaft 216 (e.g., by engaging features on the second shaft 216). As depicted in FIG. 3, the rotor support structure 404 extends in an axially forward direction, and the rotor attachment arm 340 extends axially rearward from an end of the rotor support structure 404. Such axially forward extension of the rotor support structure 404 provides additional space rearward of the electrical machine 400 for disposal of additional components (e.g., coolant manifolds, oil supply lines etc.) that may be incorporated into the electrical machine 400 and propulsion engine 100. In embodiments, the rotor support structure 404 extends only in the radial direction 274.

Figure 4:
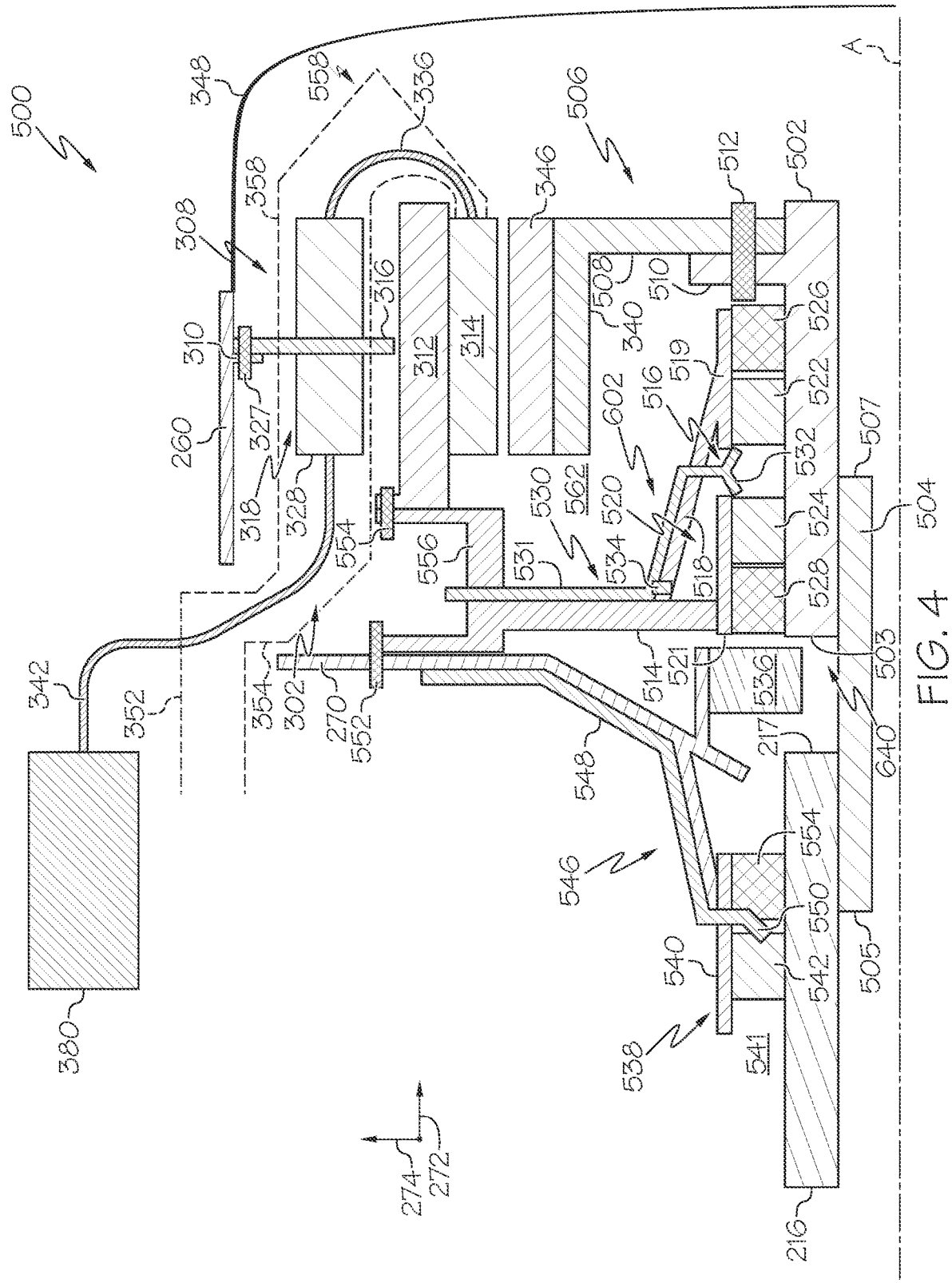
FIG. 4 schematically depicts a sectional view of an electrical machine that may be incorporated into the propulsion engine depicted in FIG. 1 according to one or more embodiments described herein.

Referring now to FIG. 4, a cross-sectional view of an electrical machine 500 that may be integrated into a propulsion engine (such as the propulsion engine 100 described herein with respect to FIG. 1) is schematically depicted. The electrical machine 500 may include components of the electrical machine 300 described herein with respect to FIG. 2. Accordingly, like reference numerals are utilized in FIG. 4 to indicate the incorporation of such like components. The electrical machine 500 differs from the electrical machine 300 in that the electrical machine 500 is not directly connected to the second shaft 216, but rather indirectly thereto via an electrical machine shaft 502. The electrical machine shaft 502 is attached to the aft end 217 of the second shaft 216 by an intermediate shaft member 504. In embodiments, the intermediate shaft member 504 is attached to the second shaft 216 such that axial and radial vibrations of the second shaft 216 are not transferred to the electrical machine shaft 502. For example, in embodiments, the intermediate shaft member 504 comprises a quill shaft comprising a first spline (not depicted) at a forward end 505 thereof. The first spline may be inserted into an opening at the aft end 217 of the second shaft 216 to rotationally couple the second shaft 216 and the electrical machine shaft 502. A second spline (not depicted) at an aft end 507 of the intermediate shaft member 504 may be inserted into a connection end 503 of the electrical machine shaft 502. Such spline couplings between the electrical machine shaft 502 and the second shaft 216 may permit axial and radial movement of the electrical machine shaft 502 relative to the second shaft 216 such that the electrical machine 500 does not alter the natural vibration frequencies of the second shaft 216. In embodiments, rather than a quill shaft, the intermediate shaft member 504 may include a bellows spring member permitting relative axial and radial movement of the electrical machine shaft 502 relative to the second shaft 216. In embodiments, the intermediate shaft member 504 includes a shear section that is structured to decouple (e.g., rupture) when placed under a predetermined shear load. In embodiments, the intermediate shaft member 504 and the electrical machine shaft 502 may be integrated into a single component.

The electrical machine shaft 502 is radially supported via a generator bearing assembly 516 attached to the second engine stator component 270 via a bolted connection 552. The generator bearing assembly 516 includes a bearing support frame 514 extending radially between the electrical machine shaft 502 and the second engine stator component 270. As depicted, the bearing support frame 514 includes an axial portion 518 defining a bearing cavity 520 in conjunction with the electrical machine shaft 502. First and second bearing support arms 519 and 521 extend from the bearing support frame 514 in the axial direction 272. A first generator bearing 522 extends between the first bearing support arm 519 and a first portion of the electrical machine shaft 502 and a second generator bearing 524 extends between the second bearing support arm 521 and a second portion of the electrical machine shaft 502 to rotatably contact the electrical machine shaft 502 (e.g., inner races connected to the electrical machine shaft 502 may house the first and second generator bearings 522 and 524 to provide such rotatable contact). The first and second generator bearings 522 and 524 may include various types of bearings (e.g., ball bearings, roller bearings, or the like) depending on the implementation. The first and second generator bearings 522 and 524 protect the electrical machine 500 from radial and axial movements of the second shaft 216.

FIG. 4 also depicts an engine bearing assembly 538 associated with the propulsion engine 100. For example, in embodiments, the engine bearing assembly 538 may support the second shaft 216 via the second engine stator component 270 (e.g., the second engine stator component 270 may include a support structure extending radially inward of the inner hub 226 of the turbine rear frame 222). The engine bearing assembly 538 includes an engine bearing support arm 540 extending from the second engine stator component 270. The engine bearing support arm 540 defines an engine bearing cavity 541 in conjunction with the second shaft 216. An engine bearing 542 is disposed within the engine bearing cavity 541 and extends between the engine bearing support arm 540 and the second shaft 216. The engine bearing 542 rotatably contacts the second shaft 216 such that the second engine stator component 270 supports the second shaft 216.

The electrical machine 500 is thus supported by dedicated bearings (e.g., the first and second generator bearings 522 and 524) on the electrical machine shaft 502 to protect the electrical machine 500 from vibrations of the second shaft 216. In embodiments, the engine bearing cavity 541 and the bearing cavity 520 are fluidly isolated one another to mitigate the risk contamination of the engine bearing assembly 538 during maintenance of the electrical machine 500. For example, in the embodiment depicted in FIG. 4, the generator bearing assembly 516 includes a first sealing member 526 extending between the first bearing support arm 519 and the electrical machine shaft 502 and a second sealing member 528 extending between the second bearing support arm 521 and the electrical machine shaft 502. The first and second sealing members 526 and 528 may be constructed of a suitable compliant material (e.g., labyrinth air seals) to generate seals at the interfaces between the first and second sealing members 526 and 528 and the electrical machine shaft 502.

The engine bearing assembly 538 further comprises a sealing member 544 disposed between the engine bearing support arm 540 and the second shaft 216. The sealing member 544 generates a seal at the interface between it and the second shaft 216. The sealing member 544 is disposed axially between the engine bearing 542 and the generator bearing assembly 516 such that the engine bearing assembly 538 is fluidly isolated from the generator bearing assembly 516. Such isolation of the bearing assemblies facilitates provision of lubricant from separate sources to reduce the risks of contamination during maintenance. For example, in the depicted embodiment, the propulsion engine 100 comprises an engine bearing lubrication system 546 and a generator bearing lubrication system 530. The generator bearing lubrication system 530 includes an oil supply line 531 supported by the bearing support frame 514. In embodiments, the oil supply line 531 extends through an opening in the axial portion 518 into the bearing cavity 520. The generator bearing lubrication system 530 further includes an oil ejection nozzle 532 including outlets disposed proximate to the first and second generator bearings 522 and 524 such that oil from a lubricant source (not depicted) travels through the oil supply line 531 and is ejected onto surfaces of the first and second generator bearings 522 and 524 to provide lubrication and cooling during operation thereof. The generator bearing lubrication system 530 also includes an oil scavenge 534 facilitating circulation of oil out of the bearing cavity 520.

The engine bearing lubrication system 546 includes an oil supply line 548 and an oil ejection nozzle 550 including an outlet disposed proximate to the engine bearing 542 to provide lubrication during operation thereof. By utilizing separate bearing lubrication systems (e.g., separate oil supply lines 531 and 548) to provide lubricant to the generator bearing assembly 516 and the engine bearing assembly 538, the embodiment depicted in FIG. 4 mitigates the risks associated with performing maintenance on the electrical machine 500.

While the depicted embodiment incorporates a generator bearing lubrication system 530 and an engine bearing lubrication system 546 that are oil-based, it should be understood that alternative lubrication systems using different types of lubricants are contemplated and within the scope of the present disclosure. Various types of fluid-based lubricants (e.g., synthetic polymer-based lubricants), gas-based lubricants, or solid lubricants may also be used in accordance with the present disclosure. Isolating the separate lubrication systems associated with the generator and engine bearings generally avoids complications in the engine bearing assembly resulting from maintenance of the electrical machine 500, thereby avoiding disrupting operation of the remainder of the propulsion engine 100.

Referring still to FIG. 4, the electrical machine 500 further differs from the electrical machine 300 described herein with respect to FIG. 2 in that the electrical machine comprises a rotor assembly 506 that differs in structure from the rotor assembly 304 described herein. The rotor assembly 506 comprises a rotor support structure 508 that is attached to the electrical machine shaft 502 via a mounting flange 510 of the electrical machine shaft 502. The rotor support structure 508 is attached to the mounting flange 510 by a connecting bolt 512 extending through the mounting flange 510 and the rotor support structure 508. The rotor support structure 508 extends from the electrical machine shaft 502 and the rotor attachment arm 340 extends axially therefrom to support the rotor 346 in a desired position. In embodiments, the rotor support structure 508 extends diagonally from the electrical machine shaft 502 (e.g., similar to the rotor support structures 338 and 404 described herein with respect to FIGS. 2 and 3).

In the depicted embodiment, the rotor 346 is disposed radially inward of the stator assembly 302. As discussed herein, such inner rotor design facilitates independent removal of the rotor assembly 506. Because the mounting flange 510 of the electrical machine shaft 502 is disposed axially aft of the bearing support frame 514, the connecting bolt 512 may be accessed without removal of the bearing support frame 514, which allows removal of the rotor assembly 506 independently from the stator assembly 302. Additionally, due to the inner-rotor construction of the electrical machine 500, the stator support arm 312 may act as a debris shield for containing any broken components of the rotor assembly 506. It should be appreciated that embodiments incorporating various aspects of the electrical machine 500 (e.g., the electrical machine shaft 502, the intermediate shaft member 504, the generator bearing assembly 516) are also envisioned where the rotor 346 is disposed radially outward of the stator assembly 302.

The separate shaft coupling of the electrical machine 500 via the electrical machine shaft 502 further facilitates separation of the electrical machine 500 from the propulsion engine 100 by decoupling the intermediate shaft member 504. As depicted in FIG. 4, the propulsion engine 100 includes a decoupling device 536 extending from the second engine stator component 270. The decoupling device 536 axially overlaps the intermediate shaft member 504 such that, upon activation of the decoupling device 536, the decoupling device 536 performs an action on intermediate shaft member 504 decouple the electrical engine shaft 502 from the second shaft 216 to protect the second shaft 216 from malfunctioning of the electrical machine 500 by mechanical disconnect of the electrical machine 500 from the second shaft 216.

To facilitate disassembly of the electrical machine 500 from the propulsion engine 100 via the splines of the intermediate shaft member 504, the manner with which the stator assembly 302 is connected to the propulsion engine 100 may be modified as compared with the generator assembly 300 described herein with respect to FIG. 3. As depicted in FIG. 4, the stator assembly 302 is not directly connected to the second engine stator component 270, but rather to the bearing support frame 514. The bearing support frame 514 is connected to the second engine stator component 270 via a first connection bolt 552, and the stator support arm 312 is connected to the bearing support frame 514 via a second connection bolt 554. An axial portion 556 of the bearing support frame 514 extends between the first and second connection bolts 552 and 554 to axially separate the stator support arm 312 from the second engine stator component 270. In embodiments, the first connection bolt 552 may be detached to facilitate removal of the electrical machine shaft 502 from the intermediate shaft member 502 via the splined connection. Thus, the spline coupling provided by the intermediate shaft member 504 facilitates removal of the entire electrical machine 504 (e.g., the electrical machine shaft 502, the bearing support frame 514, the generator bearing assembly 516, the rotor assembly 506, and the stator assembly 302) as a single module to reduce the risk of contamination. After removal of the electrical machine 500, the intermediate shaft member 502 may be removed as well.

In embodiments, the second connection bolt 554 may be loosened to facilitate removal of the stator assembly 302 without using the decoupling device 536 (e.g., removal of the connection bolts 327, 554, and 512 may facilitate removal of the rotor assembly 506 and stator assembly 302 from the propulsion engine 100 independently of the bearing support frame 514). As such, the depicted design facilitates flexibility in the operations that may be performed to remove the electrical machine 500 (or portions thereof) from the propulsion engine 100. In embodiments, the bearing support frame 514 and stator support arm 312 may be structured from different materials for desired function and durability. In embodiments, the stator support arm 312 and the bearing support frame 514 are integrated into a single part.

Figure 5:
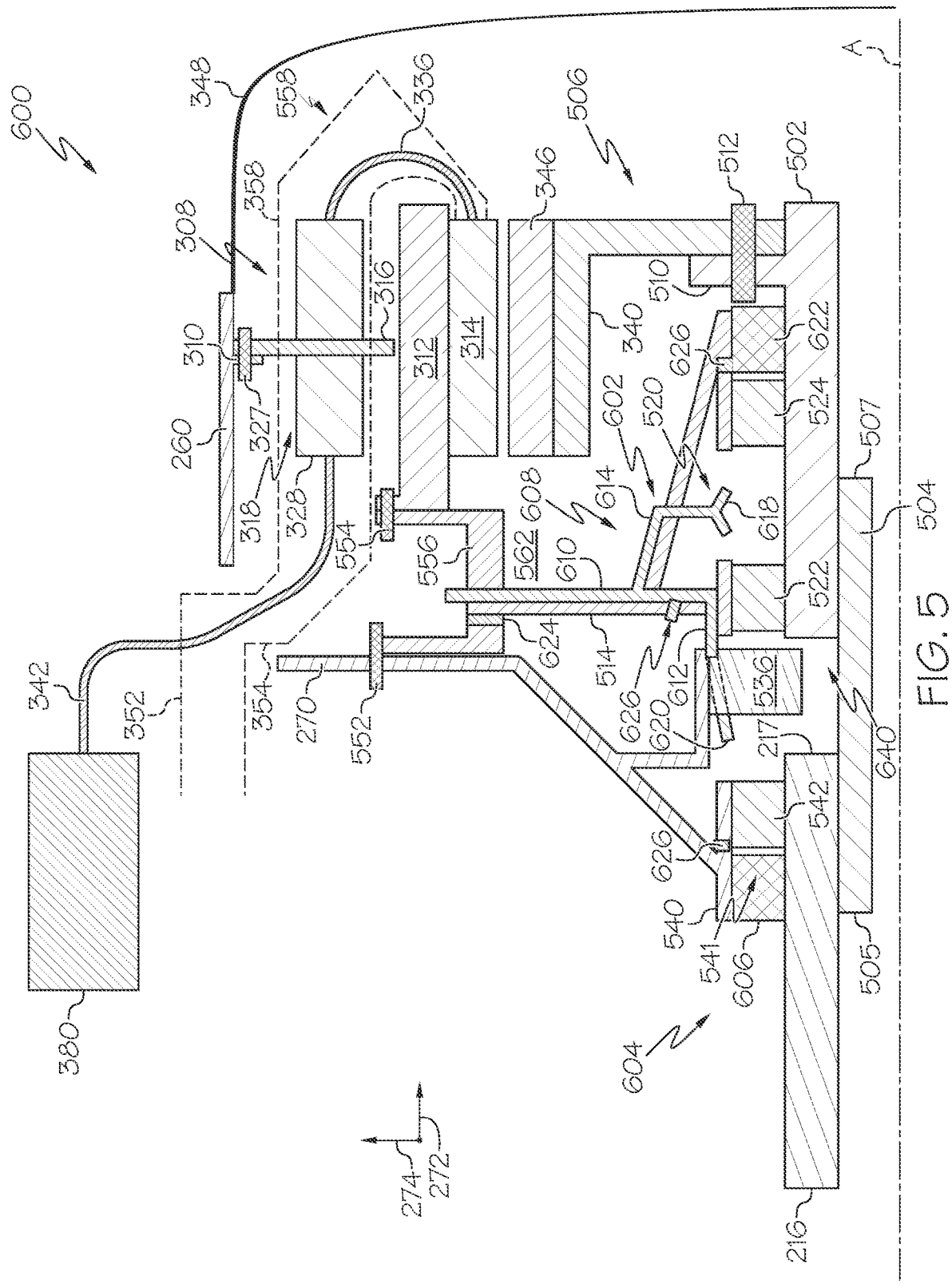
FIG. 5 schematically depicts a sectional view of an electrical machine that may be incorporated into the propulsion engine depicted in FIG. 1, according to one or more embodiments described herein.

Referring now to FIG. 5, a cross-sectional view of an electrical machine 600 that may be integrated into a propulsion engine (such as the propulsion engine 100 described herein with respect to FIG. 1) is schematically depicted. The electrical machine 600 may include components of the electrical machine 500 described herein with respect to FIG. 5. Accordingly, like reference numerals are utilized in FIG. 5 to indicate the incorporation of such like components. The electrical machine 600 differs from the electrical machine 500 described herein with respect to FIG. 4 in that the electrical machine 600 includes a generator bearing assembly 602 and an engine bearing assembly 604 that are disposed in a common sump 640 defined at least in part by the bearing support frame 514 and the second engine stator component 270. As depicted in FIG. 5, the generator bearing assembly 602 includes the first and second generator bearings 522 and 524 described with respect to FIG. 4, but only includes a single generator bearing sealing member 622 disposed axially aft of the second generator bearing 524. The engine bearing assembly 604 includes the engine bearing 542 described with respect to FIG. 4, but includes a single engine bearing sealing member 606 disposed axially forward of the engine bearing 542. The sealing members 622 and 606 seal off the common sump 640 to contain lubricant supplied to the bearings.

In the electrical machine 600, the common sump 640 is not sealed axially between the first and second generator bearings 522 and 524 and the engine bearing 542. That is, the bearing cavity 520 and the bearing cavity 541 described with respect to FIG. 4 are not fluidly isolated from one another. Such lack of sealing between the bearings allows a common lubrication source to be used to lubricate the first and second generator bearings 522 and 524 and the engine bearing 542. For example, in the depicted embodiment, a bearing lubrication system 608 is used to supply lubricant to the engine bearing 542 and the first and second generator bearings 522 and 524. The bearing lubrication system 608 includes an oil supply line 610 extending into the coolant cavity 562 from a lubricant source (not depicted). The oil supply line 610 branches into a generator portion 614 extending axially aft into the bearing cavity 520 and an engine portion 612 extending axially forward into the bearing cavity 541. An oil nozzle 618 at an end of the generator portion 614 includes outlets providing oil to the first and second generator bearings 522 and 524. An oil nozzle 620 disposed at an end of the engine portion 612 includes an outlet for supplying oil to the engine bearing 542. The bearing lubrication system 608 further includes one or more drain passages 626 disposed proximate to each of the bearings 522, 524, and 542 for receiving oil after the oil has been applied to the bearings 522, 524, and 542. Embodiments may incorporate drain passages in the portion of the second engine stator component 270 disposed proximate to the decoupling device 536. The drain passages 626, 628, 630 may drain the oil near the bearings 522, 524, and 542 into the common sump 640. A scavenge 624 may route oil to a scavenge line for filtration and reuse.

The common sump 640 of the electrical machine 600 thus facilitates utilization of one bearing lubrication system 608 (e.g., including a single oil supply line 610 from a lubrication source), and includes a simpler structure than the multiple lubrication systems (e.g., the generator bearing lubrication system 530 and the engine bearing lubrication system 546) associated with the electrical machine 500 described with respect to FIG. 4. The reduction in oil lines, seals, and connections in the electrical machine 600 may reduce the weight and complexity of the electrical machine 600 over the electrical machine 500 described with respect to FIG. 4.

In view of the foregoing description, it should be appreciated that an electrical machine may be integrated into a propulsion engine of an aircraft. A stator assembly of the electrical machine may be coupled to one or more engine stator components of the propulsion engine, while the rotor assembly may be coupled directly or indirectly to a shaft of the propulsion engine to facilitate an exchange of rotational energy between the shaft and the electrical machine. The rotor assembly may either be directly connected to the shaft by a rotor support structure attached to the shaft or indirectly connected to the shaft via an intermediate shaft member and an electrical machine shaft. In such embodiments, the electrical machine may be supported on its own bearings to protect the electrical machine from vibrations of the shaft and protect the shaft from vibrations of the electrical machine. The electrical machine may also be removed in its entirety by a splined connection with the intermediate shaft member to avoid risks of magnetic contamination of the electrical machine during maintenance. The electrical machine may be constructed and positioned to facilitate relatively easy access and removal thereof to facilitate maintenance while the propulsion engine is installed on an aircraft.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an endpoint of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Further aspects of the invention are provided by the subject matter in the following clauses:

1. An electrical machine comprising: a stator assembly coupled to an engine stator component of a propulsion engine, the stator assembly comprising: a stator support assembly fixedly attached to the engine stator component; and a stator disposed on a supporting surface of the stator support structure; and a rotor assembly comprising a rotor support structure connected to a shaft of the propulsion engine and a rotor attached to the rotor support structure such that the rotor is disposed radially inward of the stator, wherein the rotor exchanges rotational energy with the shaft to operate as either an electrical motor or an electrical generator.

2. The electrical machine of any preceding clause, wherein the stator assembly circumferentially surrounds the rotor assembly such that the rotor assembly is disposed radially between the shaft and the stator assembly.

3. The electrical machine of any preceding clause, wherein the stator support assembly comprises a stator support arm extending in an axial direction parallel to the shaft, the stator support arm defining the supporting surface, wherein the stator support arm is at least as long as the rotor assembly in the axial direction such that an entirety of the rotor assembly is disposed in a rotor cavity delineated by the stator support arm and the stator support arm shields the propulsion engine from the rotor assembly.

4. The electrical machine of any preceding clause, further comprising: an electrical connection device coupled to the stator support assembly; and an electrical line extending from the stator to the electrical connection device.

5. The electrical machine of any preceding clause, further comprising an electrical machine control unit, the electrical machine control unit being electrically connected to the stator via the, wherein the electrical machine control unit is configured to switch operation of the electrical machine between a generator mode to generate electrical power from rotation of the shaft and a motor mode in which the stator adds rotational energy to the shaft.

6. The electrical machine of any preceding clause, wherein the rotor assembly is directly connected to an end of the shaft.

7. The electrical machine of any preceding clause, wherein no portion of the stator assembly extends axially aft of the rotor assembly.

8. The electrical machine of any preceding clause, further comprising: an electrical machine shaft coupled to an end of the shaft of the propulsion engine via an intermediate shaft member extending axially between the shaft and the electrical machine shaft; and a generator bearing assembly comprising: a bearing support frame extending between the electrical machine shaft and the engine stator component; and generator bearings supporting the electrical machine shaft, wherein the electrical machine shaft rotates within generator bearing in conjunction with the shaft of the propulsion shaft to rotate the rotor.

9. The electrical machine of any preceding clause, further comprising a cooling system comprising one or more cooling manifolds directing coolant from a coolant source to regions proximate to the stator and the rotor.

10. An electrical machine comprising: a stator assembly coupled to an engine stator component of a propulsion engine, the stator assembly comprising: a stator support assembly fixedly attached to the engine stator component; and a stator disposed on a supporting surface of the stator support structure; and a rotor assembly comprising a rotor support structure directly connected to a shaft of the propulsion engine and a rotor attached to the rotor support structure, wherein: the rotor is disposed radially inward of the stator such that the stator assembly circumferentially surrounds the rotor, and at least one of: the rotor rotates in conjunction with the shaft to generate a power signal, and the electrical machine receives power from an external source to provide rotational energy to the shaft.

11. The electrical machine of any preceding clause, wherein the rotor support structure is directly connected to an end of the shaft of the propulsion engine by a removable connection such that the rotor assembly is independently removable from the propulsion engine.

12. The electrical machine of any preceding clause, wherein the rotor support structure is directly connected to the shaft between ends of the shaft of the propulsion engine.

13. The electrical machine of any preceding clause, wherein the rotor support structure extends in a radial and an axial direction from the end of the shaft to mechanically alter a natural vibration mode of the shaft.

14. The electrical machine of any preceding clause, further comprising an electrical machine control unit, the electrical machine control unit being electrically connected to the stator, wherein the electrical machine control unit is configured to actively modulate an electrical machine load to influence electrical machine rotation to dampen vibrations of the shaft.

15. The electrical machine of any preceding clause, further comprising a cooling system comprising one or more cooling manifolds directing coolant from a coolant source to regions proximate to the stator and the rotor.

16. The electrical machine of any preceding clause, wherein an electrical line extending from the stator is at least partially routed through the one or more cooling manifolds.

17. An electrical machine comprising: a stator assembly coupled to an engine stator component of a propulsion engine, the stator assembly comprising: a stator support assembly fixedly attached to the engine stator component; and a stator disposed on a supporting surface of the stator support structure; and an electrical machine shaft coupled to an end of a shaft of the propulsion engine via an intermediate shaft member extending axially between the end of the shaft and the electrical machine shaft; a bearing support frame extending from the propulsion engine, the bearing support frame including an axial portion extending in an axial direction; electrical machine bearings radially extending from the axial portion of the bearing support frame to rotatably contact the electrical machine shaft; a sealing member disposed axially aft of the electrical machine bearings, the sealing member extending from the axial portion of the bearing support frame to the electrical machine shaft; and a rotor assembly comprising: a rotor support structure connected to the electrical machine shaft; and a rotor attached to the rotor support structure such that the rotor is disposed radially inward of the stator, wherein at least one of: the rotor rotates in conjunction with the shaft of the propulsion engine via the intermediate shaft member to generate a power signal, and the electrical machine receives power from an external source to provide rotational energy to the shaft.

18. The electrical machine of any preceding clause, wherein the rotor support structure is connected to the electrical machine shaft axially rearward of the generator bearing to facilitate removal of the rotor from the electrical machine shaft.

19. The electrical machine of any preceding clause, further comprising a decoupling device attached to the propulsion engine, the decoupling device positioned to axially overlap the intermediate shaft member to decouple the intermediate shaft member.

20. The electrical machine of any preceding clause, further comprising a seal extending between the bearing support frame and the electrical machine shaft, the seal fluidly isolating the electrical machine bearings from bearings of the propulsion engine.

21. An electrical machine comprising: a stator assembly coupled to an engine stator component of a propulsion engine, the stator assembly comprising: a stator support assembly fixedly attached to the engine stator component; and a stator disposed on a supporting surface of the stator support structure; and an electrical machine shaft coupled to an end of a shaft of the propulsion engine via an intermediate shaft member extending axially between the end of the shaft and the electrical machine shaft; a bearing support frame extending from the propulsion engine, the bearing support frame defining a bearing cavity in conjunction with the electrical machine shaft; first and second electrical machine bearings radially extending from the bearing support frame to rotatably contact the electrical machine shaft; a sealing member disposed axially aft of the electrical machine bearings, the sealing member extending from the bearing support frame to the electrical machine shaft; a rotor support structure connected to the electrical machine shaft; and a rotor attached to the rotor support structure, wherein the rotor rotates in conjunction with the electrical machine shaft to exchange energy with the shaft of the propulsion engine.

22. The electrical machine of any preceding clause, wherein: the bearing cavity is defined by the bearing support frame in conjunction with the electrical machine shaft, and an engine bearing of the propulsion engine is disposed within the bearing cavity.

23. The electrical machine of any preceding clause, further comprising: an oil supply line extending through the bearing support frame into a common sump defined at least in part between the bearing support frame and the electrical machine shaft; a first oil nozzle extending from the oil supply line and disposed proximate to the electrical machine bearings; and a second oil nozzle extending from the oil supply line and disposed proximate to the engine bearing.

24. The electrical machine of any preceding clause, wherein: the stator assembly comprises a stator support arm connected to the engine stator component via an axial portion of the bearing support frame; and the oil supply line extends through the axial portion of the bearing support frame into the common sump.

25. The electrical machine of any preceding clause, further comprising an engine bearing support arm connected to the second engine stator component, the engine bearing support arm defining an engine bearing cavity in conjunction with the shaft of the propulsion engine.

26. The electrical machine of any preceding clause, further comprising a first sealing member and a second sealing member extending between the bearing support frame and the electrical machine shaft to seal off the bearing cavity.

27. The electrical machine of any preceding clause, further comprising: a first oil supply line extending through the bearing support frame into the bearing cavity; and a second oil supply line extending into the engine bearing cavity.

28. The electrical machine of any preceding clause, further comprising a decoupling device attached to the propulsion engine, the decoupling device axially overlapping the intermediate shaft member such that the decoupling device decouples the intermediate shaft member upon activation.

29. The electrical machine of any preceding clause, wherein the intermediate shaft member permits movement of the electrical machine shaft relative to the shaft of the propulsion engine in an axial direction and a radial direction.

30. The electrical machine of any preceding clause, wherein the intermediate shaft comprises a quill shaft comprising a first spline disposed at a first end thereof and a second spline disposed at a second end thereof, wherein the first and second splines are inserted into openings at ends of the shaft of the propulsion engine and the electrical machine shaft to permit the movement of the electrical machine shaft in the axial and radial directions.

31. The electrical machine of any preceding clause, wherein entireties of the rotor and the rotor support structure are disposed radially inward of the stator assembly.

32. The electrical machine of any preceding clause, wherein the rotor support structure is connected to an end of the electrical machine shaft by a removable connection such that the rotor support structure and rotor are independently removable from the propulsion engine.

33. The electrical machine of any preceding clause, wherein the intermediate shaft comprises a shear section structured to decouple when placed under a predetermined shear load.

34. A propulsion engine comprising: a core portion generating exhaust that travels in an axial direction; a turbine section coupled to a shaft, wherein the turbine section receives the exhaust and generates mechanical energy to rotate the shaft; a turbine frame attached to the turbine section, the turbine frame comprising: an outer casing coupled to the turbine section; and an inner hub supporting the shaft via a bearing assembly comprising an engine bearing supporting the shaft; and an electrical machine comprising: a stator assembly comprising a stator support assembly attached to the inner hub and a stator attached to the stator support structure; an electrical machine shaft coupled to an end of the shaft via an intermediate shaft member extending axially between the end of the shaft and the electrical machine shaft; a bearing support frame attached to the inner hub and extending radially inward therefrom to define a bearing cavity extending between the bearing support frame and electrical machine shaft; electrical machine bearings radially extending from the bearing support frame to rotatably contact the electrical machine shaft; and a rotor assembly comprising: a rotor support structure connected to the electrical machine shaft; and a rotor attached to the rotor support structure and extending radially inward of the stator, wherein the rotor rotates in conjunction with the shaft via the intermediate shaft member to exchange energy with the shaft.

35. The propulsion engine of any preceding clause, wherein: the turbine frame further comprises a plurality of struts extending between the outer casing and the inner hub, and at least one of the plurality of struts defines an internal cavity having a cooling duct disposed therein.

36. The propulsion engine of any preceding clause, wherein the electrical machine further comprises a cooling system comprising a stator manifold to provide coolant from a coolant source to the stator assembly and the rotor assembly.

37. The propulsion engine of any preceding clause, wherein the intermediate shaft member and the electrical machine shaft are an integrated component.

38. The propulsion engine of any preceding clause, further comprising a decoupling device axially overlapping the intermediate shaft member such that the decoupling device decouples the intermediate shaft member upon activation.

39. The propulsion engine of any preceding clause, wherein the intermediate shaft member permits movement of the electrical machine shaft relative to the shaft of the propulsion engine in an axial direction and a radial direction.

40. The propulsion engine of any preceding clause, further comprising a sealing member extending between the bearing support frame and the electrical machine shaft to seal the bearing cavity.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An electrical machine comprising:
   a stator assembly coupled to an engine stator component of a propulsion engine, the stator assembly comprising:
      a stator support assembly fixedly attached to the engine stator component; and
      a stator disposed on a supporting surface of the stator support structure; and
   an electrical machine shaft coupled to an end of a shaft of the propulsion engine via an intermediate shaft member extending axially between the end of the shaft and the electrical machine shaft;
   a bearing support frame extending from the propulsion engine, the bearing support frame defining a bearing cavity in conjunction with the electrical machine shaft;
   first and second electrical machine bearings radially extending from the bearing support frame to rotatably contact the electrical machine shaft;
   a sealing member disposed axially aft of the electrical machine bearings, the sealing member extending from the bearing support frame to the electrical machine shaft;
   a rotor support structure connected to the electrical machine shaft; and
   a rotor attached to the rotor support structure, wherein the rotor rotates in conjunction with the electrical machine shaft to exchange energy with the shaft of the propulsion engine.

2. The electrical machine of claim 1, wherein:
   the bearing cavity is defined by the bearing support frame in conjunction with the electrical machine shaft, and
   an engine bearing of the propulsion engine is disposed within the bearing cavity.

3. The electrical machine of claim 2, further comprising:
   an oil supply line extending through the bearing support frame into a common sump defined at least in part between the bearing support frame and the electrical machine shaft;
   a first oil nozzle extending from the oil supply line and disposed proximate to the electrical machine bearings; and
   a second oil nozzle extending from the oil supply line and disposed proximate to the engine bearing.

4. The electrical machine of claim 3, wherein:
   the stator assembly comprises a stator support arm connected to the engine stator component via an axial portion of the bearing support frame; and
   the oil supply line extends through the axial portion of the bearing support frame into the common sump.

5. The electrical machine of claim 1, further comprising an engine bearing support arm connected to the second engine stator component, the engine bearing support arm defining an engine bearing cavity in conjunction with the shaft of the propulsion engine.

6. The electrical machine of claim 5, further comprising a first sealing member and a second sealing member extending between the bearing support frame and the electrical machine shaft to seal off the bearing cavity.

7. The electrical machine of claim 6, further comprising:
   a first oil supply line extending through the bearing support frame into the bearing cavity; and
   a second oil supply line extending into the engine bearing cavity.

8. The electrical machine of claim 1, further comprising a decoupling device attached to the propulsion engine, the decoupling device axially overlapping the intermediate shaft member such that the decoupling device decouples the intermediate shaft member upon activation.

9. The electrical machine of claim 1, wherein the intermediate shaft member permits movement of the electrical machine shaft relative to the shaft of the propulsion engine in an axial direction and a radial direction.

10. The electrical machine of claim 9, wherein the intermediate shaft comprises a quill shaft comprising a first spline disposed at a first end thereof and a second spline disposed at a second end thereof, wherein the first and second splines are inserted into openings at ends of the shaft of the propulsion engine and the electrical machine shaft to permit the movement of the electrical machine shaft in the axial and radial directions.

11. The electrical machine of claim 1, wherein entireties of the rotor and the rotor support structure are disposed radially inward of the stator assembly.

12. The electrical machine of claim 1, wherein the rotor support structure is connected to an end of the electrical machine shaft by a removable connection such that the rotor support structure and rotor are independently removable from the propulsion engine.

13. The electrical machine of claim 1, wherein the intermediate shaft comprises a shear section structured to decouple when placed under a predetermined shear load.

14. A propulsion engine comprising:
   a core portion generating exhaust that travels in an axial direction;
   a turbine section coupled to a shaft, wherein the turbine section receives the exhaust and generates mechanical energy to rotate the shaft;
   a turbine frame attached to the turbine section, the turbine frame comprising:
      an outer casing coupled to the turbine section; and
      an inner hub supporting the shaft via a bearing assembly comprising an engine bearing supporting the shaft; and
   an electrical machine comprising:
      a stator assembly comprising a stator support assembly attached to the inner hub and a stator attached to the stator support structure;
      an electrical machine shaft coupled to an end of the shaft via an intermediate shaft member extending axially between the end of the shaft and the electrical machine shaft;
      a bearing support frame attached to the inner hub and extending radially inward therefrom to define a bearing cavity extending between the bearing support frame and electrical machine shaft;
      electrical machine bearings radially extending from the bearing support frame to rotatably contact the electrical machine shaft; and
      a rotor assembly comprising:
         a rotor support structure connected to the electrical machine shaft; and
         a rotor attached to the rotor support structure and extending radially inward of the stator, wherein the rotor rotates in conjunction with the shaft via the intermediate shaft member to exchange energy with the shaft.

15. The propulsion engine of claim 14, wherein:
   the turbine frame further comprises a plurality of struts extending between the outer casing and the inner hub, and at least one of the plurality of struts defines an internal cavity having a cooling duct disposed therein.

16. The propulsion engine of claim 15, wherein the electrical machine further comprises a cooling system comprising a stator manifold to provide coolant from a coolant source to the stator assembly and the rotor assembly.

17. The propulsion engine of claim 14, wherein the intermediate shaft member and the electrical machine shaft are an integrated component.

18. The propulsion engine of claim 14, further comprising a decoupling device axially overlapping the intermediate shaft member such that the decoupling device decouples the intermediate shaft member upon activation.

19. The propulsion engine of claim 14, wherein the intermediate shaft member permits movement of the electrical machine shaft relative to the shaft of the propulsion engine in an axial direction and a radial direction.

20. The propulsion engine of claim 14, further comprising a sealing member extending between the bearing support frame and the electrical machine shaft to seal the bearing cavity.

* * * * *

UNITED STATES PATENT AND TRADEMARK OFFICE
CERTIFICATE OF CORRECTION

| | | |
|---|---|---|
| PATENT NO. | : 11,566,533 B2 | |
| APPLICATION NO. | : 17/170229 | |
| DATED | : January 31, 2023 | |
| INVENTOR(S) | : Miroslaw Czarnik et al. | |

It is certified that error appears in the above-identified patent and that said Letters Patent is hereby corrected as shown below:

On the Title Page

In page 2, Column 2, item (56), U.S. patent documents, cite no. 20, delete "Vemna et al." and insert --Verna et al.--, therefor.

Signed and Sealed this
Fourth Day of April, 2023

*Katherine Kelly Vidal*

Katherine Kelly Vidal
*Director of the United States Patent and Trademark Office*